United States Patent [19]

Sickafus

[11] Patent Number: 5,592,037
[45] Date of Patent: Jan. 7, 1997

[54] ANALOG DISPLAY DEVICE WITH MICRO-MOTOR DRIVE MEANS

[75] Inventor: Edward N. Sickafus, Grosse Ile, Mich.

[73] Assignee: Ford Motor Company, Dearborn, Mich.

[21] Appl. No.: 122,968

[22] Filed: Sep. 20, 1993

Related U.S. Application Data

[63] Continuation-in-part of Ser. No. 43,956, Apr. 5, 1993, Pat. No. 5,412,265.

[51] Int. Cl.$^6$ .............................. H02K 1/06; H02K 3/00; G01D 7/02
[52] U.S. Cl. .................. 310/40 MM; 310/268; 73/866.1
[58] Field of Search .................. 310/28, 38, 40 MM, 310/49 A, 68 R, 268, DIG. 6; 73/866.1

[56] References Cited

U.S. PATENT DOCUMENTS

| | | | |
|---|---|---|---|
| 3,416,015 | 12/1968 | Ordas | 310/49 R |
| 3,482,126 | 12/1969 | Bradley | 310/49 R |
| 3,492,615 | 1/1970 | Watkins | 310/49 R |
| 3,495,107 | 2/1970 | Haydon | 310/49 R |
| 4,351,653 | 9/1982 | Becker et al. | 55/394 |
| 4,493,753 | 1/1985 | Becker et al. | 204/9 |
| 4,551,157 | 11/1985 | Becker et al. | 55/17 |
| 4,563,251 | 1/1986 | Becker et al. | 204/6 |
| 4,661,212 | 4/1987 | Ehrfeld et al. | 204/11 |
| 4,677,332 | 6/1987 | Heyraud | 310/184 |
| 4,693,791 | 9/1987 | Becker et al. | 204/11 |
| 4,694,548 | 9/1987 | Ehrfeld et al. | 29/157 C |
| 4,698,285 | 10/1987 | Ehrfeld et al. | 430/5 |
| 4,705,605 | 11/1987 | Becker et al. | 204/11 |
| 4,726,936 | 2/1988 | Erdt et al. | 422/159 |
| 4,738,010 | 4/1988 | Ehrfeld et al. | 29/149.5 R |
| 4,744,863 | 5/1988 | Guckel et al. | 156/653 |
| 4,745,813 | 5/1988 | MacManus | 73/866.1 |
| 4,784,935 | 11/1988 | Ehrfeld et al. | 430/321 |
| 4,797,211 | 1/1989 | Ehrfeld et al. | 210/321.84 |
| 4,801,830 | 1/1989 | Ogino et al. | 310/68 B |
| 4,853,669 | 8/1989 | Guckel et al. | 338/4 |
| 4,872,888 | 10/1989 | Ehrfeld et al. | 55/16 |
| 4,897,360 | 1/1990 | Guckel et al. | 437/7 |
| 4,990,827 | 2/1991 | Ehrfeld et al. | 313/533 |
| 4,996,082 | 2/1991 | Guckel et al. | 427/99 |
| 5,013,693 | 5/1991 | Guckel et al. | 437/248 |
| 5,013,954 | 5/1991 | Shibaike et al. | 310/309 |
| 5,054,522 | 10/1991 | Kowanz et al. | 137/625.33 |
| 5,063,344 | 11/1991 | Linke | 324/115 |
| 5,113,100 | 5/1992 | Taghezout | 310/40 MM |
| 5,191,251 | 3/1993 | Paratte | 310/309 |
| 5,216,310 | 6/1993 | Taghezout | 310/268 |
| 5,252,881 | 10/1993 | Muller et al. | 310/309 |
| 5,331,236 | 7/1994 | Sexton | 310/40 MM |

OTHER PUBLICATIONS

"A Planar Variable Reluctance Magnetic Micromotor with Fully Integrated Stator and Wrapped Coils"—Chong H. Ahn, et al, School of Electrical Engineering Feb. 1993 00–7803–0957 pp. 1–5.

(List continued on next page.)

Primary Examiner—Thomas M. Dougherty
Assistant Examiner—Michael Wallace, Jr.
Attorney, Agent, or Firm—Allan J. Lippa; Roger L. May

[57] ABSTRACT

An analog-display device, such as a gauge or the like, includes a moveable display member driven by a planar micro-motor. The micro-motor comprises a substrate, a stator for receiving electrical current to generate an electromagnetic field, and a rotor which is rotatable in response to electromagnetic fields generated by the stator. In the stator, a plurality of electrically conductive micro-coils are supported by the substrate and arrayed in a first plane. A plurality of magnetic members is arrayed in the rotor in a second plane substantially parallel to the first plane. The visible display member of the analog display device is mounted for movement by rotation of the rotor body. Analog display devices of the invention can be used in motor vehicle instrument panels, wherein the micro-motor carrying the display member can be mounted, as by cementing, to the display face of the device.

9 Claims, 13 Drawing Sheets

OTHER PUBLICATIONS

"A First Functional Current Excited Planar Rotational Magnetic Micromotor" H. Guckel, et al, Wisconsin Center for Applied Microelectronics Feb. 1993 0–7803–0957 pp. 7–11.

"A New Fabrication Process for Capacitive Pressure Sensor" S. Miyoshi, et al, Central Research Laboratories, Sharp Corp., pp. 309–311.

Peters (1989) Rev. Sci. Instr. 60: 2789–2793.

"M–S Specification" (1990) Microtechnique Switec 1–5, 1.

"The Liga Technique" (1990) Micromechanics Europe Tech. Digest.

Frazier et al (1992) Micro Electro Mech. Systems Conference.

Engelmann, et al (1992) Micro Electro Mech. Systems Conference.

Wagner, et al (1992) Micro Electro Mech. Systems Conference.

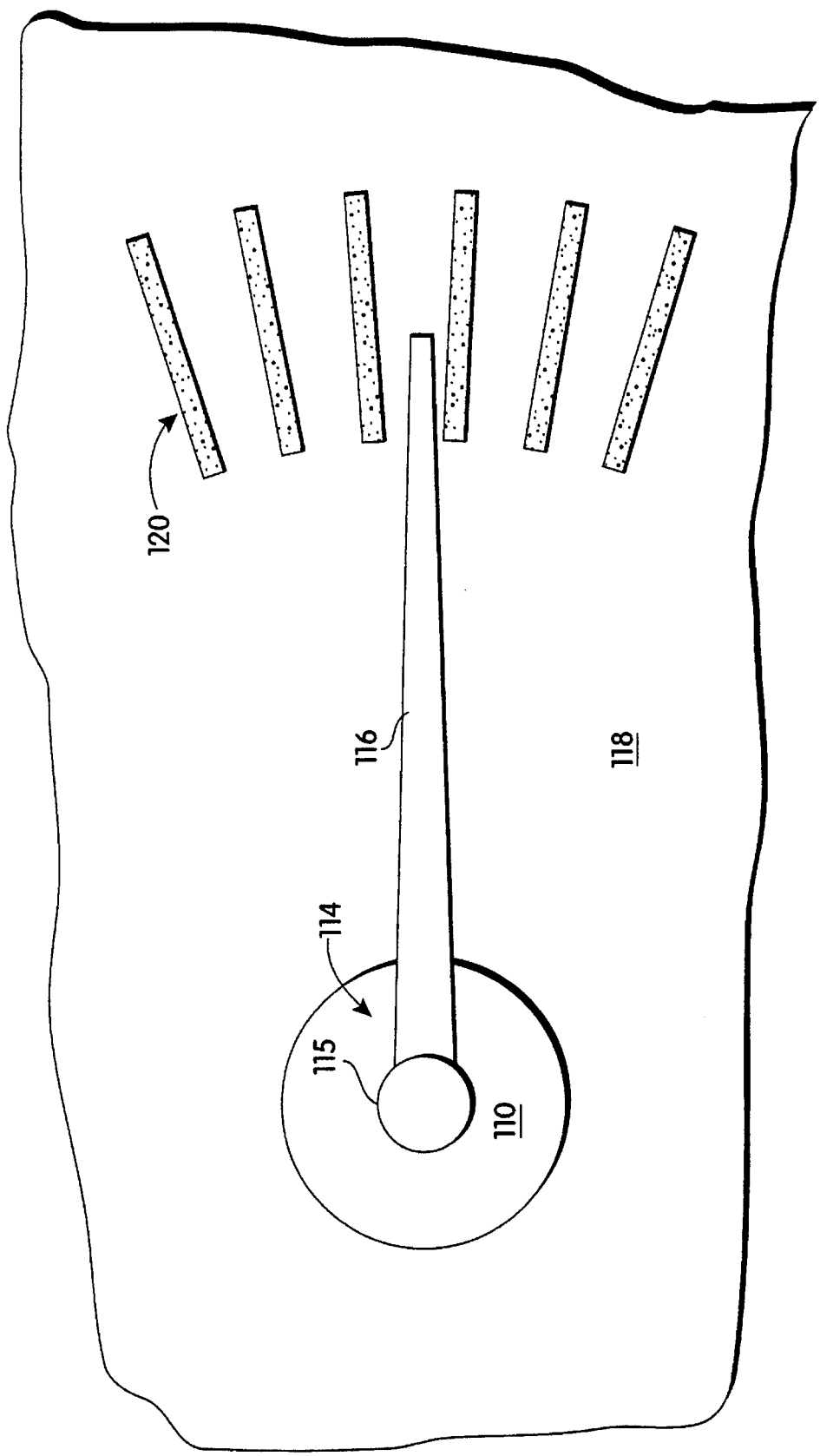

ANALOG DISPLAY DEVICE WITH MICRO-MOTOR DRIVE MEANS

CROSS-REFERENCE TO RELATED APPLICATION

This appication is a continuation-in-part of my patent application Ser. No. 08/043,956, filed Apr. 5, 1993 now U.S. Pat. No. 5,412,265 and entitled "Planar Micro-motor and Method of Fabrication."

INTRODUCTION

The present invention is directed to analog-display devices and, more particularly to analog-display devices having planar micro-motor drive means for driving a display member.

BACKGROUND OF THE INVENTION

Analog-display devices, such as dial gauges and the like with moveable indicators are widely used in innumerable applications including, for example, motor vehicle instrument panel gauges. Gauges presently used in instrument panels generally have drive means which are either locally or remotely mounted. Frequently this requires mounting the drive means to the underside or back surface of the display face of the device, and passing a drive member through the display face to the indicator. Considerable complexity, component and assembly costs, and weight are often involved in use of such devices.

Technologies for microfabrication of miniature devices often are referred to as MEMS for microelectromechanical systems. MEMS technologies include those that employ the thin-film deposition and patterning procedures of the silicon electronics industry. Cost efficiencies can be achieved through batch processing of silicon wafers. MEMS techniques have been used, for example, in bulk micromachining of pressure sensors and accelerometers. More recently, thin films of polycrystalline silicon supported on a sacrificial layer have been used to produce even smaller versions of such devices. Miniature electrostatic motors and electrically driven actuators also have been fabricated using MEMS. A new microfabrication technology known as LIGA (an acronym taken from German words referring to lithography, electroplating and injection molding) expands MEMS to designs based on plastics, metals, alloys and ceramics. LIGA also supports batch processing and uses all of the thin-film technologies of the silicon-based electronics industry. A common feature of LIGA and silicon micromachining is that both processes typically begin with a photolithography step. LIGA is further and more critically characterized as a process employing highly collimated x-rays from a synchrotron to do the lithographic projection. In LIGA a two-dimensional pattern is projected into a thick polymer film forming a latent image. This image is then developed by chemical removal of the exposed regions leaving a three-dimensional structure having patterned features with relatively high aspect ratio: wall height divided by feature width. Surface micromachining of poly-Si typically produces features with minimum widths of 1 to 2 microns (µm) and equivalent heights; giving aspect ratios of unity. In the LIGA process minimum feature sizes of 2 µm width by 300 µm height are routine; thus obtaining aspect ratios on the order of 100.

The LIGA process has been commercialized by Micro-Parts, GmbH (Karlsruhe, Germany), through an association with the Karlsruhe Nuclear Research Center, and has been used to make microdevices with movable parts, for example, microturbines, movable spring elements and acceleration sensors with stationary electrodes and movable seismic mass members. Other exemplary devices produced using such technologies include: a microturbine with a 150 µm diameter rotor; micro-electrostatic motor with 0.6 mm rotor diameter; an electrostatic linear actuator; optic fiber multiplexer/demultiplexer with 10 fibers; copper coils with 20 µm by 100 µm conductors wound with 20 µm spacings; 12-tooth gears 80 µm in diameter by 140 µm height with 28 µm center bore, pulleys, pulley-belts, assembled gear trains and clamps.

Other MEMS technologies applicable to the present invention include those referred to as MPP-MEMS ("micro-patterned polymers for MEMS"). Instead of using PMMA resist and synchrotron exposures as in LIGA, the MPP-MEMS approach is to use a photosensitive polyimide as the resist and expose it with ultra violet light. Electroforming is then used to form devises and features in the patterned polyimide. The minimum feature size typically is not as small as in LIGA and the aspect ratio not as high.

SUMMARY OF THE INVENTION

In accordance with the present invention, an analog-display device comprises an indicator having a display member such as a needle pointer, etc., for visibly displaying a position, for example, for pointing to a value or gauge mark on a display face of the device. The analog-display device further comprises, in combination with the indicator, a planar micro-motor for driving the display member, that is, for moving the display member to the appropriate position. The planar micro-motor comprises a stator supported by a substrate and having electromotive force means comprising a plurality of circumferentially spaced micro-coils arrayed in a first plane for receiving electrical current to selectively generate electromagnetic fields. A rotor means of the micro-motor comprises a rotor body aligned over the electromotive force means in a second, parallel plane. It is rotatable in the second plane in response to the electromagnetic fields generated by the electromotive force means. The visible display member is mounted for movement by rotation of the rotor and in certain embodiments may be mounted directly to the rotor, most preferably to a rotor shaft having a longitudinal axis of rotation intersecting the plane of the micro-coils. The rotor means further comprises a plurality of magnetic regions, each comprising, for example, an isolated body of ferromagnetic material. The magnetic regions are circumferentially spaced in the second plane above the stator.

Energizing means preferably are provided for selectively passing electrical current from a suitable source to the micro-coils. Such energizing means typically comprises at least electrically conductive leads to the micro-coils. Typically, the micro-coils are energized, either individually or in subsets, in a pre-selected or otherwise controlled sequence, to generate electromotive forces acting on corresponding magnetic regions of the rotor across the planar gap sandwiched between the rotor and the stator. By controlling the sequence and duration of energizing each micro-coil, the amount, direction and speed of rotor body rotation can be controlled. The energizing means of the micro-motor optionally may also comprise circuitry means to control the duration and sequence of micro-coil actuation to control, in turn, the direction and degree of rotation of the rotor and, hence, the movement of the display member.

The planar micro-motor of the analog-display device of the invention can be fabricated through the use of well known techniques and materials. According to a method aspect of the invention, such known techniques and materials are applied in a novel layer-upon-layer microfabrication process. Preferred embodiments of the method of the invention employ multiple photoresist layer processing and "vias," as further described below.

The present invention is a significant advance in the art, offering the advantages of reduced complexity, assembly and components costs, and weight. Especially in the field of motor vehicle instrument panels and the like, the present invention offers the advantages of an analog-display device wherein the display member is driven by a micro-motor mounted directly to the display surface of a supporting substrate. Additional features and advantages of the invention will be further understood from the following detailed discussion of these and other preferred embodiments.

BRIEF DESCRIPTION OF THE DRAWINGS

Certain preferred embodiments of the invention are described and discussed in detail below in association with the appended drawings wherein:

FIG. 5B is a schematic plan view, partially broken away of the analog-display device of FIG. 5A;

Figure 1:
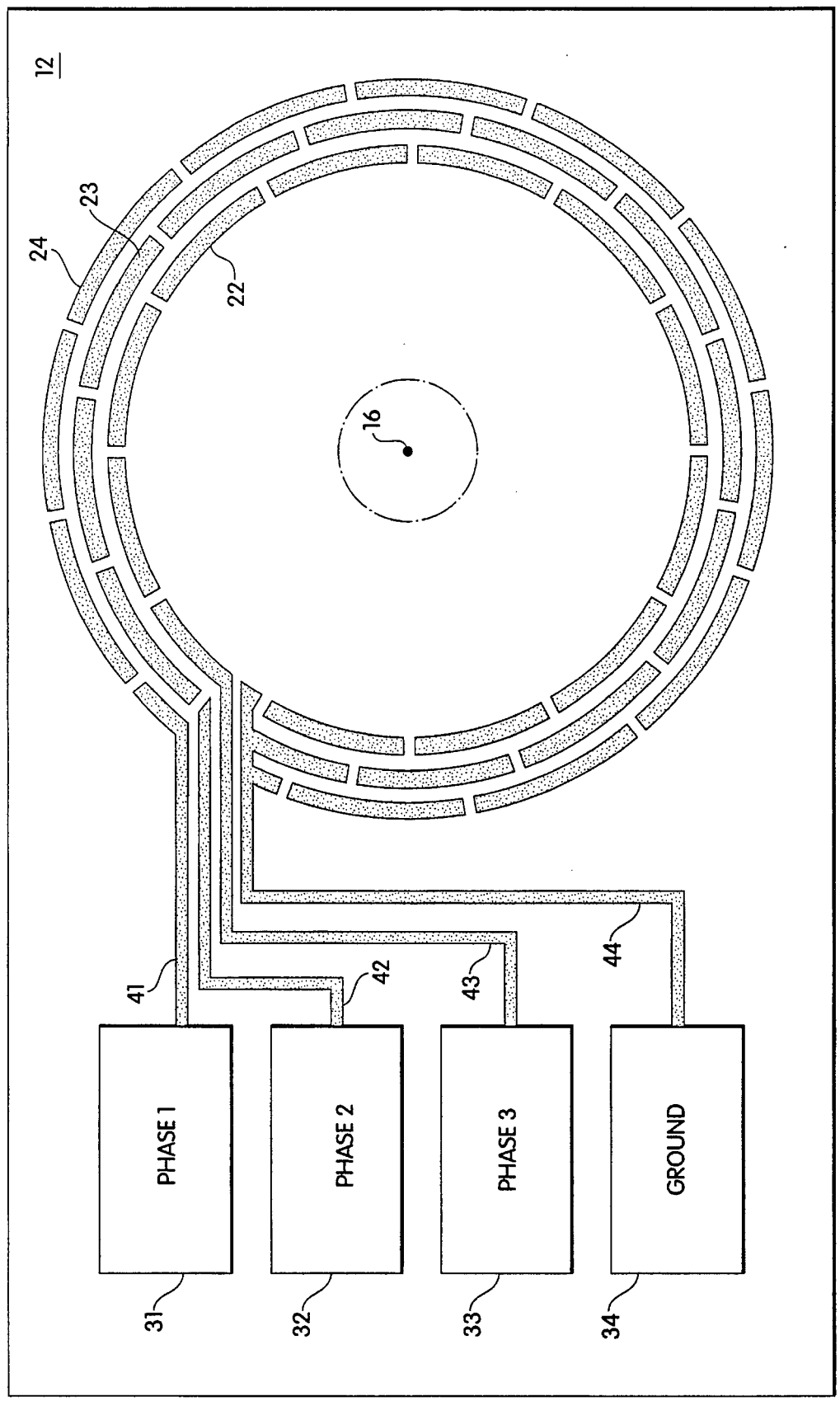
FIG. 1 is a schematic plan view of a silicon substrate with a metalization layer for components of a three-phase bifilar micro-coil stator for a micro-motor suitable for use as drive means for an analog-display device in accordance with a preferred embodiment of the invention.

The figures are not drawn to scale and should be understood to present a simplified representation of the invention illustrative of the basic principles involved. Micro-motors of the invention employed in various commercial embodiments may comprise hundreds and possibly even thousands of micro-coils. Some features have been enlarged or distorted relative to others to enable easier visualization of the design. In particular, extremely thin features may be enlarged and relatively long features may be shortened. References to direction and position, unless indicated otherwise, refer to the orientation in which micro-motor features are illustrated in the drawings. It should be understood that micro-motors of the invention can be reasonably adapted for use in any orientation, including use in changing orientations.

DETAILED DESCRIPTION OF CERTAIN PREFERRED EMBODIMENTS

Analog-display devices of the invention may have any gauge marking and the like on a display surface suitable to the intended application of the device and any suitable display members, such as a needle pointer, etc. Innumerable alternatives are well known to those having skill in designing and making such products. Suitable approaches for adapting such display members for mounting to a planar micro-motor rotor will be apparent in view of this disclosure. Similarly, suitable means for mounting the micro-motor drive means to or in the device also will be apparent in view of this disclosure, such as, for example, by cementing a bottom or other outside surface of a substrate layer of the micro-motor to the display surface portion of a supporting panel or the like.

The planar micro-motor of the invention may readily be fabricated with features having dimensions of the order of 20 microns. Minimum features sizes in preferred embodiments, typically, are of the order of 10 microns. The preferred planar designs include a stator comprised of bifilar micro-coils arranged radially in a plane, with a rotor positioned above the micro-coils. The micro-coils may have a variety of configurations, particularly with respect to their electrical connection to the energizing means. The rotor preferably has an array of radial members positioned on or in a rotor body such that at least one is always sufficiently near a bifilar micro-coil to experience the electromagnetic field generated when that micro-coil is energized. The radial members or poles may be formed of permanent magnets, which offer advantages in tailoring the shape and intensity of the magnetic field energy density and, hence, the driving force for the planar micro-motor. In this regard, it may be advantageous, in certain embodiments, to incorporate means for shielding external electromagnetic fields. The magnetic members can be made of ferromagnetic material, or magnetic materials other than ferromagnetic materials can be used, typically with weaker resulting rotational forces. Variable reluctance micro-motors (having magnetically soft material such as iron, rather than permanent magnets) are provided in accordance with alternative embodiments of the invention. The rotor body preferably is carried on a rotor axle or shaft. Upon electrically energizing the bifilar micro-coils, the resulting electromagnetic field generated around the energized coils acts on the adjacent magnetic members of the rotor body. Gradients in the resulting field pattern give rise to electromotive forces that turn the rotor on its axle as the magnetic members of the rotor are attracted to (or repelled from) the micro-coils.

More specifically, starting and driving the planar micro-motor involves sequentially energizing fewer than all of the bifilar micro-coils, such that one or more of the radially disposed magnetic members of the rotor are attracted toward the radial center-line of its adjacent coil. Energizing periods may consist of periodic applied voltages of various wave forms, including pulse strings patterned to achieve the desired energizing current. Such timing schemes are applicable over a broad frequency range up to a point at which the inertia of the system limits the ability of the rotor to keep up with the energizing frequency. The energizing voltage is cycled (or pulsed) with a phase and duration adapted to induce rotation in the desired direction. Direction of rotor rotation is suitably controlled with a minimum of three current phases. That is, a micro-coil which is in the correct position relative to a magnetic member of the rotor to cause an appropriate attractive force in the desired direction is energized and then relaxed in sufficient time to avoid slowing the rotor rotation after that magnetic member passes the angle of maximum force for that micro-coil. Similarly, proper phasing of the energizing voltage can be used to slow and/or stop the rotor. It will be apparent from the foregoing that the circumferential or lateral dimension of the magnetic members preferably is small, most preferably smaller than the corresponding dimension of the bifilar micro-coils.

Rotational motion of the rotor, including direction and amount of rotation, can be controlled with a high degree of precision by controlling the sequence and duration of micro-coil energization. That is, rotation can be sustained for a desired period of time, and otherwise controlled, by selecting an energization sequence and periods of energization of individual and/or subsets of the micro-coils to produce the desired time sequence of rotational forces acting on the rotor. The sense of the sequence pattern determines the direction of rotation. In light of these features, those skilled in the art will recognize, that the planar micro-motor of the invention can be adapted for use, in certain preferred embodiments, as a stepper motor. It will also be recognized by those skilled in the art that the planar micro-motor, comprising coplanar rotor and stator, differs from the traditional motor arrangement of a planar rotor surrounded by a coplanar stator, wherein a magnetic field is applied across the radial (cylindrical) gap between the stator and the ends of the rotor.

FIGS. 1 through 4 illustrate the metalization patterns of a stator and rotor for a preferred planar micro-motor. Numerous alternative designs are possible and will be readily apparent with the aid of this disclosure to those skilled in this area of technology. Primary factors typically affecting the choice of the number, size, radial position and spacing of the bifilar micro-coils, rotor poles (i.e., the elongate, radially extending regions of the rotor body responsive to the electromagnetic fields of the stator), etc., include, for example: (1) the scale of the lateral gradient of the magnetic energy density in the rotor plane compared with the lateral width of each magnetic region; (2) the balancing of forces to reduce wear on the axle bearing(s); (3) the total axial load on the bearing(s); (4) the moment of inertia of the rotor; (5) the magnitude of force to be applied to the rotor in a given angular position; (6) the desired smoothness of rotary motion; and (7) the desired angular resolution of the applied forces. The rotor preferably has symmetry about its axis of rotation to balance torques that could otherwise tilt the rotor axle and contribute to additional axle loads and wear. Alternative and optional features and design configurations, and factors affecting their selection, will be apparent to those skilled in the art in view of the present disclosure. The circle formed by the radially extending micro-coils preferably is substantially aligned under the circle formed by the radially extending magnetic regions of the rotor. Choosing the number and configuration of the bifilar micro-coils used will depend, in part, on the particular application intended for the planar micro-motor, and will be within the ability of those skilled in the art in view of the present disclosure.

The plane of the rotor poles is very close to the plane of the bifilar micro-coils and, when the coils are energized, the rotor experiences rotational force with both horizontal and vertical components. The horizontal force causes a torque about the axle, giving rise to rotation of the rotor. The relative magnitudes of the vertical and horizontal forces typically will depend upon factors discussed above and will be readily apparent to those skilled in the art in view of the present disclosure, including especially the position of the rotor poles with respect to the micro-coils. The source of the motive force to move the rotor is the pressure on the surfaces of the magnetic regions of the rotor created by the magnetic field intensity at the rotor surface and difference in magnetic permeability on either side of the surface. Field gradients across vertical surfaces will give rise to horizontal forces, while gradients across horizontal surfaces will give rise to vertical forces. While not wishing to be bound by theory, this pressure is believed to be represented by the equation:

$$P = \frac{1}{2}(\mu_1 - \mu_2)H^2$$

where P is the pressure, H is the magnetic intensity and $\mu_1$ and $\mu_2$ are the magnetic permeabilities. In the case of a permanent magnet of magnetization M, the pressure on a pole face (uncorrected for field leakage) is given by the product H·M.

Certain preferred embodiments of the invention comprise means for applying lift forces to the rotor during rotation, thereby reducing starting and rotational friction. An exemplary such means comprises a planar micro-coil concentric with the rotor shaft to generate such lifting force on the rotor.

In accordance with certain preferred embodiments, the instantaneous position of the rotor can be determined, either by position sensors included in the planar micro-motor, or by using the micro-coils and the rotor as position sensors. Between periods of energizing individual micro-coils, they can be logically switched to a capacitive sensing circuit according to means well known to those skilled in the art, to measure for example the capacitance between a coil (or pair of coils) and the rotor. For this purpose, the rotor body can have a thin nonmagnetic metal coating or the like over surface area facing the plane of the micro-coils. By measuring capacitance differentially between two coils and the rotor, the rotor need not be electrically connected to a reference potential, but can be a floating electrode (having a weak path to ground potential through the natural resistance of the motor components). According to alternative preferred embodiments wherein separate position sensors are used, auxiliary capacitor electrodes can be fabricated, for example, in the plane of the micro-coils or in the plane above the rotor, in order to have independent and continuous rotor position sensing.

Auxiliary sensors can be provided in accordance with the teaching of a linear rotary differential capacitance transducer (LRDCT) in an article of that name by Randall D. Peters, Rev. Sci. Instrum. 60(8), pp. 2789–2793, August 1989, and in U.S. Pat. No. 5,028,875 to Peters, both of which are incorporated herein by reference. Another suitable position sensing technique comprises monitoring differentially the back emf on pairs of nonenergized coils. Back emf monitoring is known to those skilled in the art and given this disclosure will be readily implemented in the planar micro-motor of the present invention.

Certain preferred embodiments comprise feedback control means with position sensors, such that the rotor position can be changed with arbitrarily small increments of angle, limited by the resolution of the position sensors and their associated control circuitry. Suitable control circuitry is well within the ability of those skilled in the art, given the present disclosure, as is its incorporation into a silicon substrate unitary with that employed in the fabrication of the micromotor itself.

As indicated above, the planar micro-motor component of the present invention can be adapted in accordance with certain preferred embodiments for operation as a geared or gearless stepper motor. Control circuitry can be provided, optionally as integrated microcircuitry on a silicon substrate unitary with that employed to support the bifilar micro-coils of the micro-motor, as further discussed below, to energize the micro-coils sequentially to accelerate the rotor from one stationary position to the next. Typically, the control circuitry is responsive to an externally generated signal, for example, a signal from a remotely located sensor, such as a temperature sensor, fuel level sensor, etc. More particularly, the control circuitry, in response to such signal, actuates energization of the micro-coils to move the rotor and, consequently, the display member of the analog-display device to a position corresponding to a value of the signal (e.g., its voltage). The rotor can thus be moved from one coil position to the next coil position, decelerated and stopped, and so on to each sequential coil position, with reversal of direction as desired. The movement of the rotor can be as small as the distance moved in response to one power pulse to the coils. In preferred embodiments comprising rotor position sensors in the micro-motor, the minimum step typically equals the minimum angular resolution of the detent teeth depicted in FIGS. 6 and 7. This can be achieved with a correspondingly short power pulse. Of course, at the opposite extreme, the maximum movement of the rotor can be as many complete circular rotations as desired.

Figure 2:
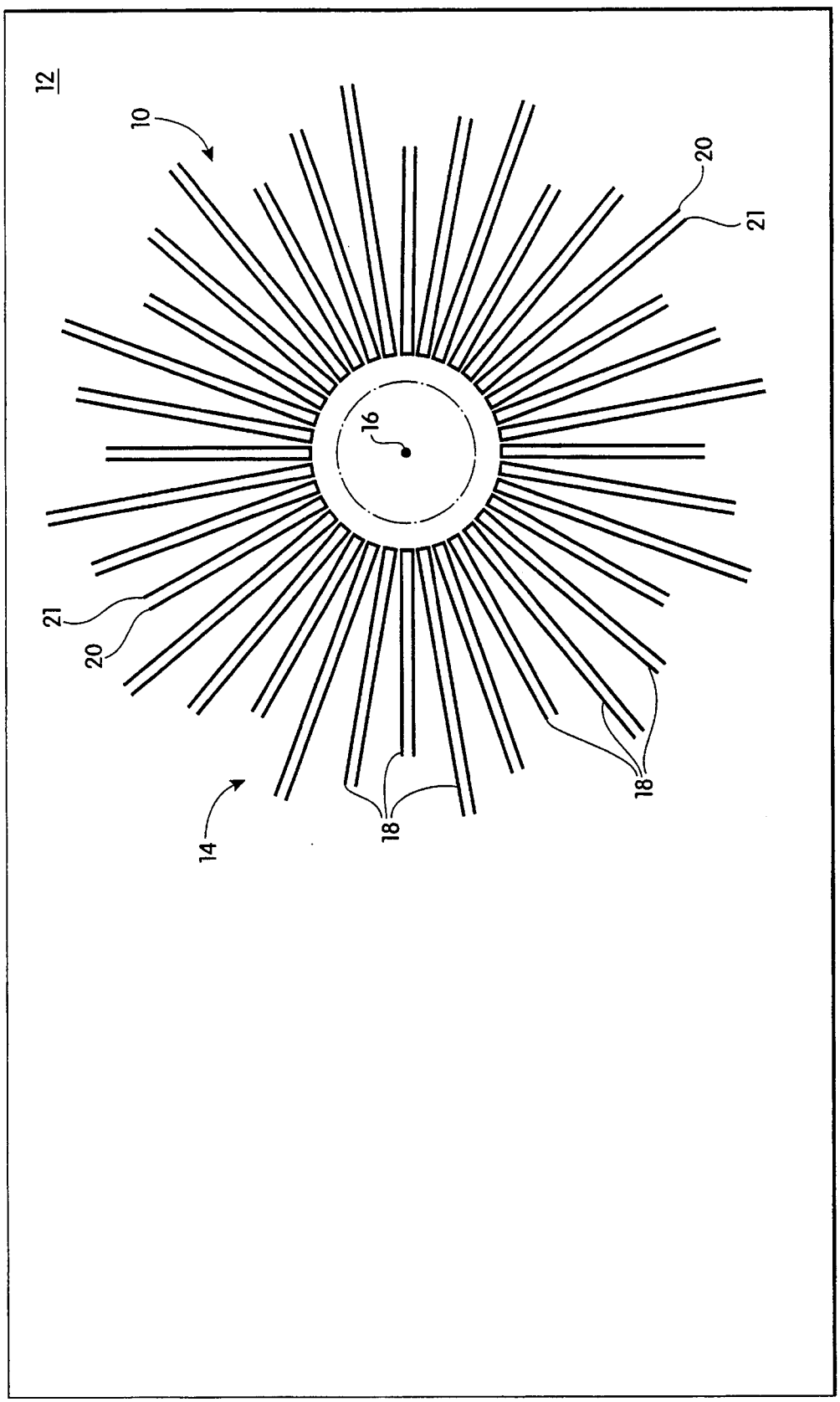
FIG. 2 is a schematic plan view of a second metalization layer on a silicon substrate, showing metalization for bifilar micro-coils for the planar micro-motor of FIG. 1.
Figure 3:
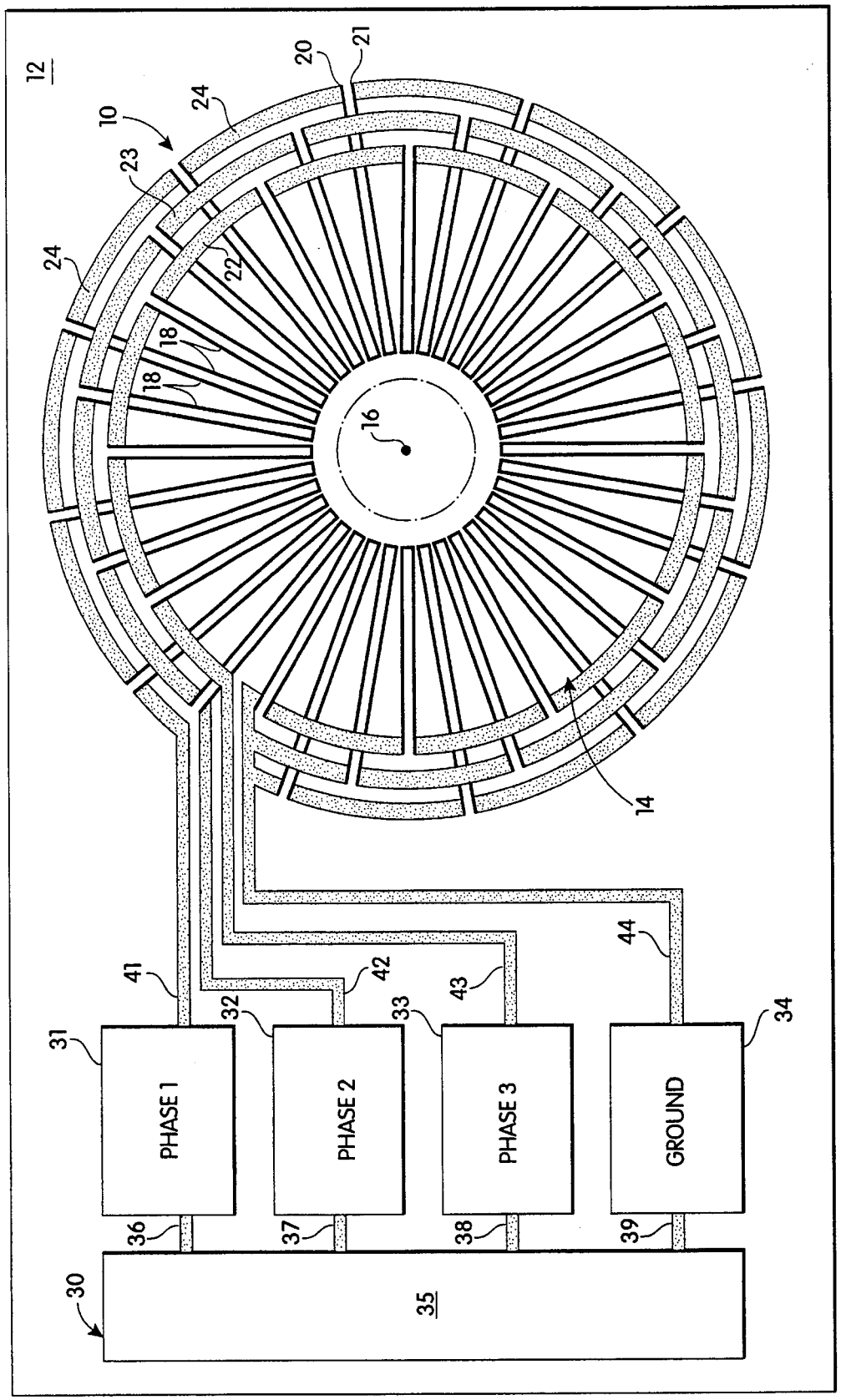
FIG. 3 is a schematic plan view of the substrate and metalization layers of FIGS. 1 and 2, together with bonding pads for electrical connection.

Referring specifically to FIGS. 1–3, metalization patterns are shown on a silicone substrate for a three-phase bifilar micro-coil stator 10 in accordance with a preferred embodiment of the invention. In particular, a substrate 12 is seen to support a metalization pattern 14 for a plurality of bifilar micro-coils arrayed radially in a plane, circumferentially spaced about a center point 16. Each of the individual bifilar micro-coils 18 is seen to extend in a U-shaped path from a first terminal 20 radially inward toward the center point 16 and back to a second terminal 21. Energizing means for the planar micro-motor, best seen in FIG. 1, comprises three concentric power busses 22, 23, and 24 supported by the substrate 12. Each of the power busses corresponds to a corresponding one of three current phases for driving the micro-motor. Each of the power busses is seen to comprise circumferentially extending segments. As best seen in FIG. 3, the circumferential segments of the power busses extend from electrical connection with the second terminal 21 of a bifilar micro-coil 18 to electrical connection with the first terminal 20 of the next bifilar micro-coil of the same current phase. Thus, the bifilar micro-coils are divided into three subsets and a continuous, electrically conductive path is created for electrical current in each of the three current phases. The power busses and subset of bifilar micro-coils of each current phase are substantially electrically isolated from those of the other two current phases by means discussed further below.

Energizing means are provided for selectively passing electrical current to the bifilar micro-coils of each current phase to cause each such subset of micro-coils to generate electromotive force at selected times and for selected durations. Such energizing means 30 comprises a plurality of electrical terminals 31–34 supported by substrate 12. Electrical terminals 31–34 may comprise bonding pads for wire bonding or other electrical connection to circuitry means for controlling electrical current to the individual subsets of the bifilar micro-coils. In the embodiment illustrated in FIG. 3, circuitry means 35 is seen to be integrated with the micromotor on substrate 12. Circuitry 35 is adapted to receive an externally generated signal and to control the sequence and duration of energization of the individual subsets of the bifilar micro-coils in response to such externally generated signal. Thus, electrical leads 36–39 provide electrical connection between circuitry means 35 and electrical terminals 31–34, respectively. Electrical leads 41–44, in turn, provide electrical connection between the electrical terminals 31–34 and the three circumferential power busses 22–24. Electrical terminal 34 represents ground and, as best seen in FIG. 3, it is connected by electrical lead 44 to all three power busses 22–24.

Figure 4A:
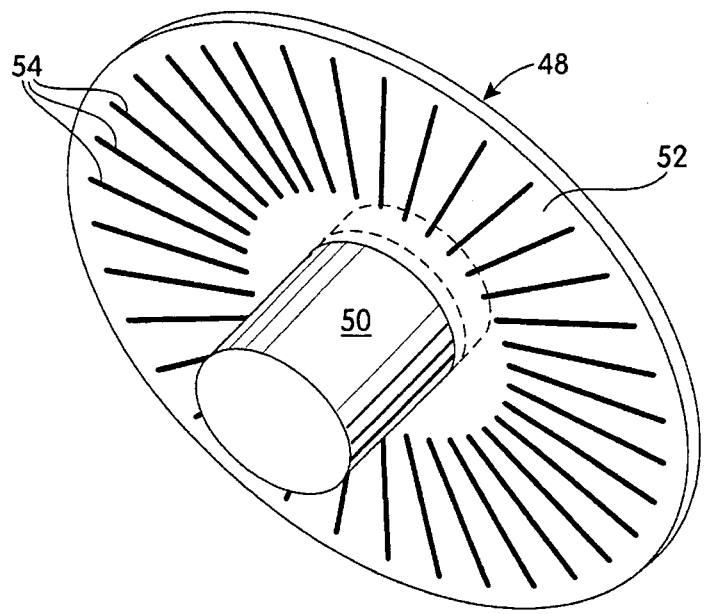
FIG. 4A is a schematic perspective view of rotor means adapted for use with the bifilar micro-coil stator and energizing means of FIGS. 1–3.

In FIG. 4A a rotor is illustrated which is suitable for use in a planar micro-motor of the invention in accordance with the embodiment illustrated in FIGS. 1–3. Specifically, the rotor 48 is seen to comprise a rotor shaft 50 and a planar rotor body 52 integral with the rotor shaft 50. A plurality of radially extending elongate pole members 54 are provided in the rotor body 52. The elongate pole members 54, in accordance with the discussion above, are adapted to be responsive to the electromagnetic fields generated during energization of the bifilar micro-coils of the stator. The elongate pole members 54 are circumferentially spaced about the rotor shaft 50 substantially in the plane of the rotor body 52. As discussed above, the elongate pole members 54 preferably are formed of ferromagnetic material, in accordance with methods described in detail below.

Figure 4B:
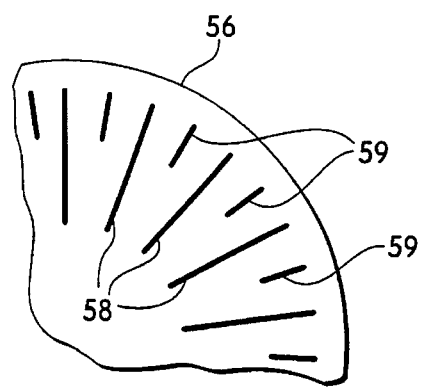
FIGS. 4B and 4C are schematic plan views, partially broken away, of alternative embodiments of the rotor means of FIG. 4A.

A first alternative embodiment of the rotor 48 is illustrated in FIG. 4B. Specifically, in rotor 56 of FIG. 4B the elongate pole members responsive to the electromagnetic fields of the bifilar micro-coils are seen to comprise a first set of longer members 58 alternating with a second set of shorter members 59. In those embodiments where the pole members are spaced closely together circumferentially, the embodiment of FIG. 4B advantageously permits greater spacing to be maintained between adjacent pole members at their radially inward ends. Such embodiments may be particularly useful in certain applications in view of the fact that greater torque is achieved at the radially outermost part of the rotor body. Similar shorter/longer interspacing can be used for the bifilar micro-coils. That is, the configuration of rotor bars having alternating long and short lengths, as shown in FIG. 4B, is advantageous for a similar configuration of bifilar micro-coils. In this case, the outer, otherwise empty spaces between the longer coils can be used to accommodate additional shorter coils, such as would match the opposing array of shorter stator bars. This configuration accomplishes a greater areal density of force generating components.

Figure 4C:
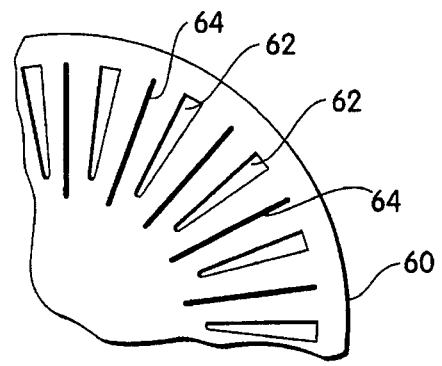

Another alternative embodiment of the rotor is schematically illustrated in FIG. 4C, wherein voids 62 are provided between each adjacent pair of elongate pole members 64. Since the mass of the rotor body must be accelerated by action of the electromagnetic forces generated by the bifilar micro-coils on the elongate pole members of the rotor body, improved acceleration can be achieved by reducing the mass of the rotor body. Preferably the voids 62 extend entirely through the rotor body. In general, however, numerous alternatives will be readily apparent to those skilled in the art with respect to the number, configuration and location of the voids. Judicious placement of such voids, in otherwise non-critical areas, to act as ports and internal ducts, enable the entry of reagents and solvents and the exit of by-products during the fabrication process.

Figure 5A:
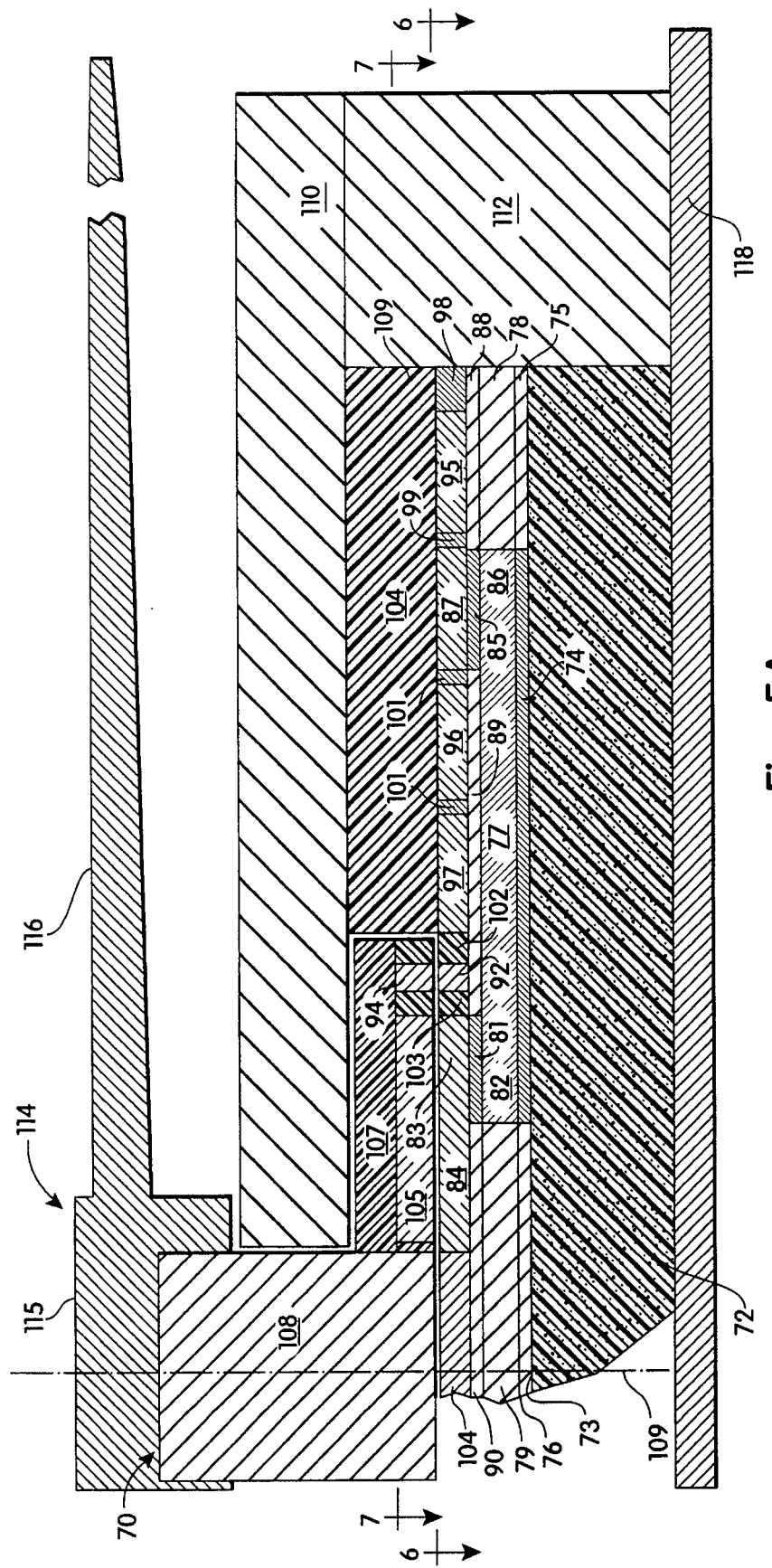
FIG. 5A is a schematic section view, partially broken away, of an analog-display device in accordance with another preferred embodiment, comprising a gearless stepper micro-motor.

Referring now to FIGS. 5A, 5B and 6–8, an analog-display device comprising a gearless stepper micro-motor in accordance with another preferred embodiment of the invention is illustrated. The device comprises a supporting panel or substrate 118, to the upper surface of which is mounted stepper micro-motor 70. The micro-motor can be mounted, for example, by cementing it to the supporting panel, etc. Alternative mounting means will be readily apparent, in view of this disclosure, as will suitable means for delivering an externally generated signal to control circuitry for the micro-motor. A display member 114 is mounted at its hub 115, such as by cementing it to an end of output shaft 108 of the micro-motor extending upwardly through an aperture in housing 110 of the micro-motor. Display member 114 further comprises an elongate display member 116 terminating in a free end overlapping gauge markings 120 shown in FIG. 5B. Gauge markings 120 are provided on the display surface of the device, comprising a visible portion of the upper surface of supporting panel 118. The marking could also be provided on or in an enclosing lens, bezel or other housing member. The hub 115 of the display member is seen in FIG. 5B to the generally concentric with the housing 110 of the micro-motor, which is described now in greater detail.

The micro-motor 70 comprises a substrate 72 supporting the various components of the micro-motor, including spacer and filler segments resulting from the method of its manufacture, in accordance with techniques described in detail below. Accordingly, taking the substrate 72 as forming a first layer of the micro-motor, the upper surface 73 of the substrate 72 carries a metallic strike layer or film 74 over a selected portion of the surface. Spacer segments 75 and 76 are seen to flank strike film 74 on the surface 73 of substrate 72. A second major layer of the micro-motor comprises electrically conductive jumper 77 positioned over strike film 74. This next layer further comprises spacer segments 78 and 79 flanking jumper 77. Jumper 77, as described above, provides electrical connection between a bifilar micro-coil of the micro-motor and a selected one of the circumferentially extending power busses. In that regard, the next higher layer of the micro-motor is a connector or "via" layer comprising electrically conductive via 81 extending vertically from the radially inward end 82 of jumper 77 to the radially outward end 83 of bifilar micro-coil 84. A second electrically conductive via 85 similarly extends vertically from the radially outward end 86 of jumper 77 to power bus 87. The connector layer further comprises spacer segments 88, 89 and 90 flanking or surrounding the vias 81 and 85. Similar jumpers and vias are provided to connect each terminal end of the bifilar micro-coils to a corresponding power bus or ground bus.

The next layer of the micro-motor comprises the bifilar micro-coils of the stator, including micro-coil 84 mentioned above. At the radially outward end of the bifilar micro-coils 50 is a circumferentially extending array of stator teeth 92 which interacts with a circumferentially extending array of rotor teeth 94 aligned above it. The micro-coil layer further comprises circumferentially extending, concentric electrical power busses 95, 87 (mentioned above) and 96, along with electrical ground bus 97. The rotor and stator teeth offer design capability for detent force control. The choice of tooth size, placement and number on both the rotor and the stator is a design option well within the skill of those knowledgeable in the art of stepper motor design. As mentioned above, jumpers and vias provide electrical connection between the terminal ends of the micro-coils and their appropriate ground and power busses. The micro-coil layer further comprises spacer segments 98–104.

The next layer of the micro-motor comprises the rotor wherein ferromagnetic pole members 105 extend radially in a plane parallel, and closely proximate, to the plane of the bifilar micro-coils. At the outer circumferential end of the rotor poles 105 is the above-mentioned array of rotor teeth 94. It can be seen that the rotor poles and rotor teeth array are located in the lower surface of the rotor body 107. Rotor body 107 is unitary with rotor shaft 108, which has an axis of rotation 109 and extends vertically upward above the rotor body through the housing of the micro-motor. The housing is seen to comprise a relatively thick horizontal cover member 110 supported at its radially outer periphery by circumferentially extending housing wall member 112.

Figure 6:
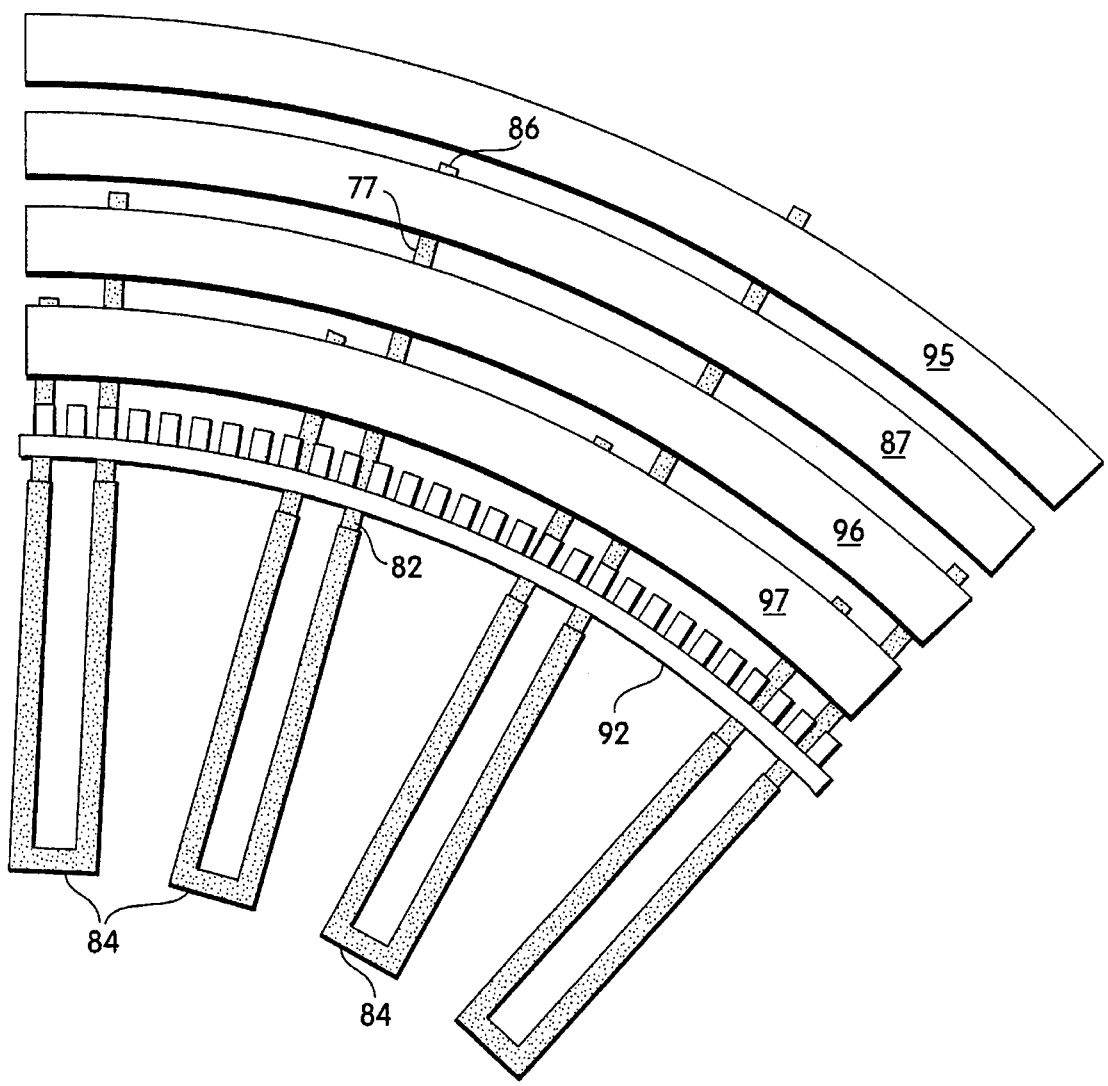
FIG. 6 is a schematic section view, partially broken away taken through line 6—6 of FIG. 5, showing bifilar micro-coils and circumferential busses of the micro-motor.
Figure 7:
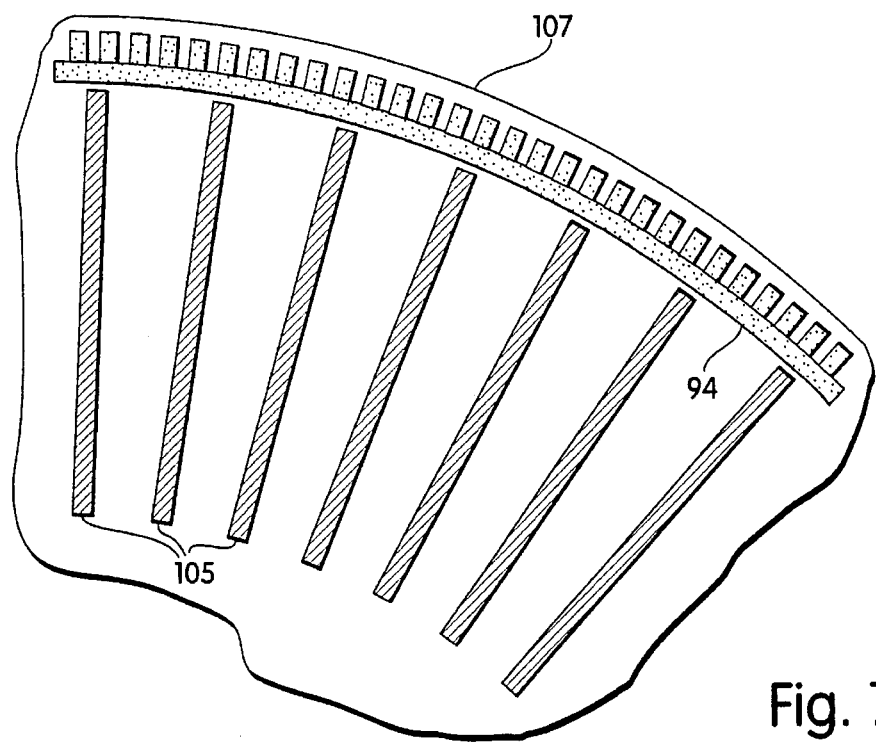
FIG. 7 is a schematic section view, partially broken away, taken through line 7—7 of FIG. 5, showing magnetic rotor poles and rotor teeth of the micro-motor.
Figure 8:
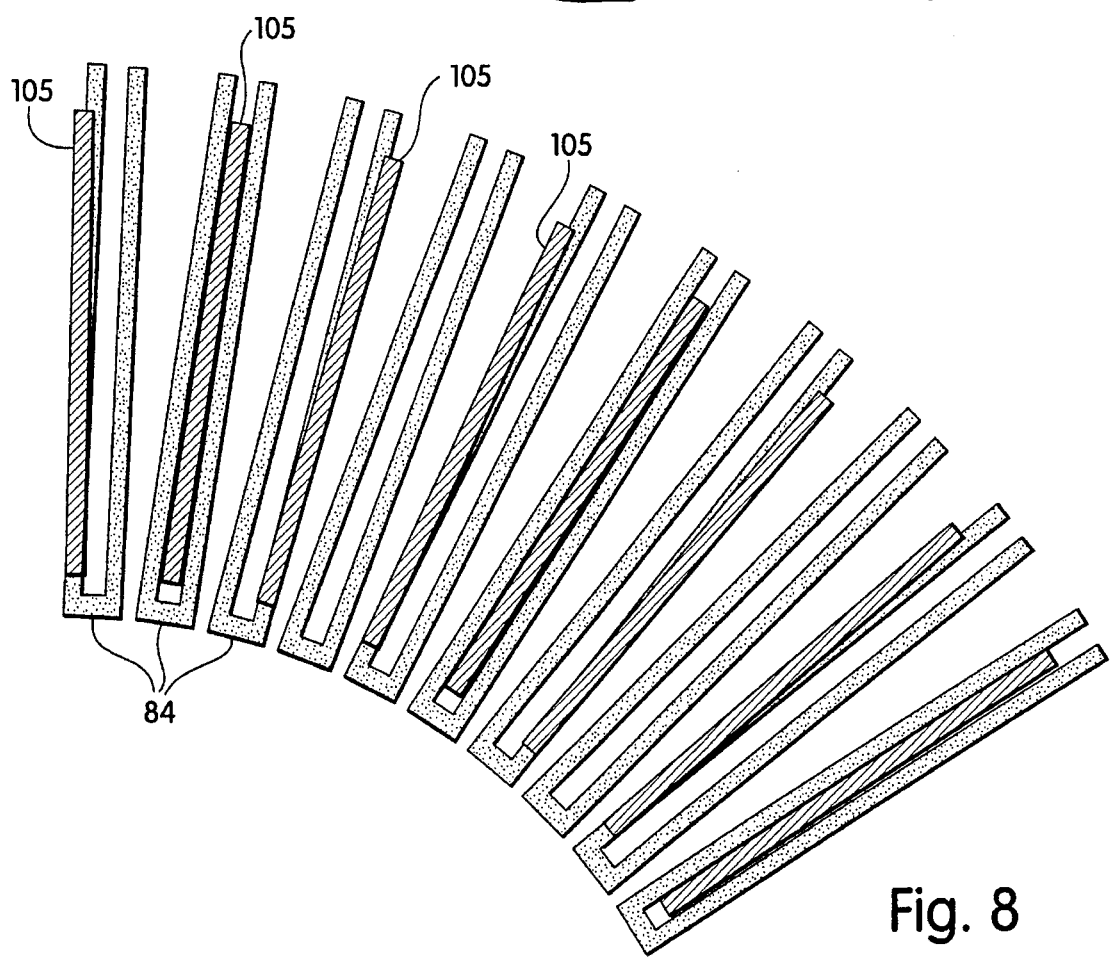
FIG. 8 illustrates the phase relationship of bifilar micro-coils to magnetic rotor members in the stepper micro-motor of FIG. 5.

The phase relationship between the magnetic rotor poles and the bifilar micro-coils of the stepper micro-motor of FIGS. 5–7 can be seen in FIG. 8. In particular, every third magnetic rotor pole is seen to have the same relative position to the bifilar micro-coil below it. Thus, in the three phase micro-motor of this embodiment, the bifilar micro-coils typically would be energized in three subsets by energizing the appropriate one of the three power busses. Each series of three micro-coils would be divided in a repeating pattern into the first, second, and third current phases. Those skilled in the art will recognize that this arrangement, in view of the phase relationship illustrated in FIG. 8, will permit selective actuation of the stator to control the direction and amount of rotation of the rotor.

In accordance with certain highly preferred embodiments, the planar micro-motor is designed for fabrication and assembly by novel application of well known microfabrication technologies including, for example, silicon micromachining, integrated circuit fabrication technologies (such as bipolar, CMOS, BIMOS) and the above discussed LIGA-type and MPP-MEMS-type technologies. Materials suitable for use in LIGA-type techniques, in particular, are those that can be deposited as films onto and into (meaning conformal deposition) prepatterned films or molded using miniature dies fabricated with LIGA or LIGA-type processes. These materials include electroplated metals, alloys, injection molded plastics, and slip-cast ceramics. The prepatterned films typically comprise photosensitive PMMA, with exposure being performed usually in a vacuum chamber on a beam line attached tangentially to an electron storage ring of a synchrotron. A typical LIGA process includes the following steps:

1. Prepare x-ray mask of patterned gold on a thin membrane;

2. Cast polymethyl-methacrylate (PMMA) resist layer on a substrate with a plating strike;

3. Align mask to substrate and expose with synchrotron x-rays;

4. Remove exposed PMMA to reveal patterned structure;

5. Electroplate metal (e.g., nickel) in patterned PMMA; and

6. Remove PMMA to produce final "direct-LIGA" device. The process can be terminated here with the production of direct-LIGA devices. To make more such devices, one can repeat the process beginning at step (2). To avoid additional synchrotron exposures, which can be expensive and time consuming, a replication process can be used, wherein the first direct-LIGA device is a mold for replication by injection molding or slip-cast molding:

7. Injection mold plastic in direct-LIGA mold;

8. Release plastic replica from mold (final product A);

9. Electroplate desired metal in the plastic replica; and

10. Release electroplated device (final product B).

In the replication process there are two points where a final product can be extracted (A and B above).

The substrate layer forms the main foundation for the micro-motor assembly and can be made of various known materials, provided the interface between the substrate and the bifilar micro-coil layer is insulating in the region of the micro-coils to avoid short circuiting the micro-coils. Silicon is the most preferred material for the substrate layer, since silicon micromachining is well known and provides a relatively hard surface that provides advantageous resistance to wear and good load bearing performance. Also, as indicated above, associated logic and control circuitry can be fabricated on the surface of the silicon substrate and connected to the micro-coils by advantageously short leads. Of course, those skilled in the art will recognize that such circuitry, rather than being integrated on the silicon substrate, may instead be pre-fabricated and mounted to or together with the micro-motor. The necessary micro-coil connections can in that case be made, for example, by metal traces on the silicon substrate connecting to the micro-coils through vertical vias. Alternatively, the substrate may comprise a metallic plate, plastic, ceramic or other material. The surface generally is finished to be smooth and planar.

The bifilar micro-coils preferably are formed of metal, for example, copper. Optional auxiliary position sensor electrodes in the micro-coil layer may be formed of aluminum and provided with electrical contact by a lead on the surface of the substrate to remote circuitry. The space between the bifilar micro-coils may be empty or filled with an insulating material. The casting material for the micro-coils, sensors, etc., e.g., a polymer such as polymethylmethacrylate (PMMA) in the case of LIGA or polyimide in the case of MPP technology, can be left in place for structural support, further simplifying the fabrication. In certain embodiments the micro-coil layer is a one piece structure micromilled (e.g., by diamond turning) to a specified flatness in accordance with techniques well known to those skilled in the art.

In the rotor layer, the rotor body comprises non-magnetic material with localized regions of magnetic material. Suitable fabrication technologies, including the aforesaid LIGA-like technologies, can be employed in the fabrication of the rotor body with patterned metallic regions. The rotor body, can be micromilled to achieve a desired thickness and flatness in accordance with well known microfabrication techniques. It can be seen in the embodiment of FIGS. 5–8 that a gap exists between the micro-coil layer and the rotor body during early portions of the fabrication process, and until the sacrificial layer is removed. Therefore, the weight of the rotor is distributed over the entire contact area of the rotor and stator. The bottom of the rotor sits on the upper surface of the micro-coil layer with planar surface-to-surface sliding contact. Typically, the rotor body will be formed unitary with the rotor shaft or can be cemented or otherwise integrated with rotor shaft. To avoid stiction between the rotor and stator, standoff bumps can be provided on the bottom of the rotor, as desired, using sacrificial layer techniques well known to those skilled in the art.

The housing members can be preferably of transparent plastic, for example PMMA. Here, again, the aforesaid LIGA technology is applicable and enables fabrication of the layer from transparent plastic with integrated shaft bearings which may be formed of metal, ceramic or plastic having adequate durability and other performance characteristics. Bearings may be provided in the housing member, either at the radial contact area with the shaft or, preferably, at the radial contact area with the rotor body. Those skilled in the art will recognize that shaft bearings optionally may extend downwardly to bear against the upper surface of the rotor body to fix its axial position. A transparent cap may be advantageous during testing of the micro-motor and/or during operation of the micro-motor in certain applications, for example in speed measurements during continuous operation. Such applications include, for example, those wherein the rotor body itself carries markings intended to be a visible position indicator during operation. The mating surface of the housing members can be micromilled in accordance with known techniques to achieve desired thickness and flatness. The cover layer also may comprise auxiliary components, such as electrodes adapted for sensing the position of the rotor or other functions.

As discussed above, control circuitry can be provided for operation of the micro-motor, for example, in response to input signals from sensors or other remote signal generating means. Integrated control circuitry including, for example, coil drivers, timing means, and logic circuitry, preferably is fabricated on the surface of the substrate layer. Such integrated circuitry can be fabricated under and/or to the side of the micro-coils. Alternatively (or in addition) circuit chips can be mounted near the micro-motor substrate and "bumped" or wire bonded to bonding pads on the substrate. Energizing means for selectively passing electrical current to the micro-coils to generate electromotive force to rotate the rotor preferably comprises bonding pads for connecting such control circuitry to the micro-coils. Bonding pads and interconnect traces can be formed as a layer of metalization on the substrate during fabrication of the micro-motor. Vias are then formed in subsequent, overlying layer(s).

An electroplating form for the micro-coils can be fabricated using microfabrication techniques, such as the LIGA technology, and then clamped in place on the silicon substrate with the micro-coil ends in registry over their respective vias, etc. Upon electroplating through the form or template, the micro-coils are automatically bonded through the vias to their proper metal leads or jumpers, etc. This approach can also provide structural bonding of the coil layer to the substrate. In final assembly of the micro-motor, layers of the structure not automatically joined can be joined by any suitable means. Layers may be cemented together, thermally or solvent bonded by fusing common plastic interfaces, externally clamped, or bolted using through holes, as well as by any combination of these techniques.

As now described, with reference to FIGS. 9–39, photolithography is used in the fabrication of micro-motors of the invention to achieve miniaturization and multiple devices from a single wafer of substrate material, preferably, a single-crystal silicon wafer using typical silicon wafer processing procedures. Numerous micro-motors can be batch fabricated from a single four-inch silicon wafer by a single operator, which can reduce labor costs. Furthermore, this type of mini-aturization, using thin film processes typical of the semiconductor electronics industry, enables various degrees of integration of electrical lines, supporting improved reliability. With LIGA-type and MPP-MEMS-type microfabrication, one adds further a larger scope of materials as well as thicker mechanical parts which support higher forces and torques.

Figure 9:
FIGS. 9–39 are schematic cross-section views, of successive stages in the fabrication of a planar micro-motor suitable for use as the drive means of an analog-display device of the invention.

Referring now specifically to FIG. 9, a silicon substrate 200 is cleaned and oxidized. A thin metal strike layer 202 is applied to the oxidized top surface 201 of the silicon substrate 200. The metal strike layer is designed to support subsequent plating. The strike is prepatterned if subsequent plating is by electroless plating, and is post-patterned if by electroplating. For certain substrate materials, the strike layer may need to be two or more layers of different materials, the first layer serving as a binder and the second layer being the pre-plating material onto which plated material may be applied directly. For a silicon substrate, a suitable metal strike layer comprises 400 Angstroms of evaporated titanium followed by 400 Angstroms of evaporated nickel. The strike layer pattern may be oversized for ease of alignment for subsequent plating of jumpers, etc.

Figure 10:
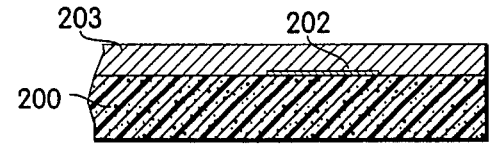
Figure 11:
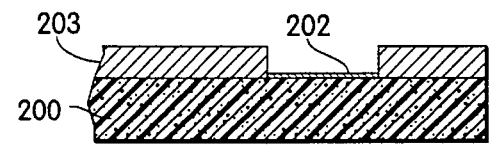
Figure 12:
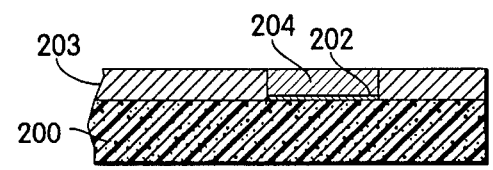
Figure 13:
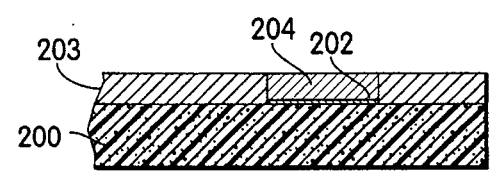

In FIG. 10, a thick layer 203 of photosensitive PMMA polymer is applied to top surface 201 of substrate 200, for example, a layer 20 μm thick. PMMA, a positive photoresist and, alternatively, a polyimide negative resist may be used. In FIG. 11, the photosensitive polymer ("PSP") is patterned for plating jumpers conforming to the patterned strike 202. As described above, the jumpers serve to pass electrical current between the bifilar micro-coils and the power busses. The jumper 204 is shown in FIG. 12, comprising copper approximately 20 μm thick. In FIG. 13 the remaining PSP is cured and left in place.

Figure 14:
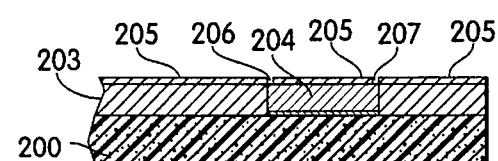
Figure 15:
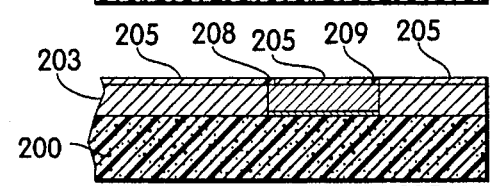

FIG. 14 illustrates a thin layer of PSP 205 spun onto the upper surface of the sub-assembly of FIG. 13, and patterned for forming connector vias. Two connector vias 206 and 207 are seen to pass through the thin layer of PSP 205 at opposite ends of jumper 204. Hereinafter, the word via or vias will be used to mean the hole passing through a layer which may subsequently be filled with the metal connector. Thus, as seen in FIG. 15, copper metal connectors 208 and 209 are electroplated into the vias shown in FIG. 14. The remaining PSP is left in place and cured, as illustrated in FIG. 16.

Figure 16:
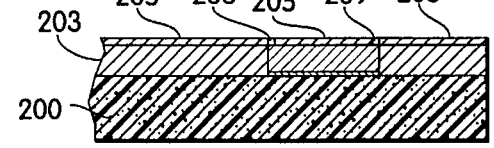
Figure 17:
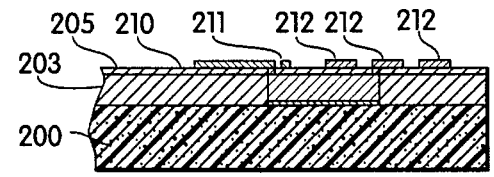
Figure 18:
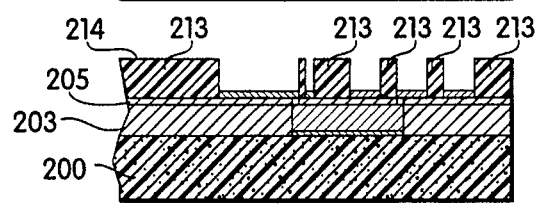
Figure 19:
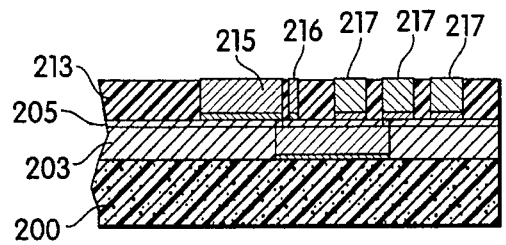
Figure 20:
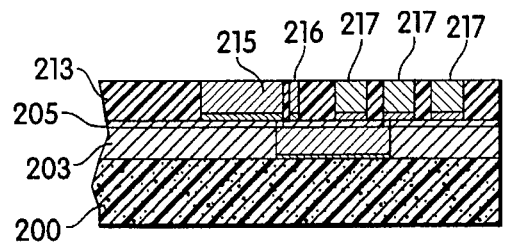

On the upper surface of the subassembly of FIG. 16, a metal strike is applied and patterned for electroplating of bifilar micro-coils, stator teeth and busses. As illustrated in FIG. 17, the patterned strike layer comprises segments 210 for the bifilar micro-coils, segments 211 for the stator teeth and segments 212 for the busses. As shown in FIG. 18, a thick layer 213 of PSP is then applied and patterned for electroplating of the micro-coils, stator teeth and busses. The length of the micro-coils is not shown to scale. The number and pattern of the stator teeth would be selected in accordance with factors known to those skilled in the art to provide a periodic detent force of the resolution required in a stepper motor application. The upper surface 214 of PSP layer 213 will be the bearing surface for the rotor, and, preferably, is micro-milled to produce a smooth surface for minimum starting friction. As seen in FIG. 19, micro-coils 215, stator teeth 216 and busses 217 are electroplated into the patterned PSP layer 213. If different metals are selected for the bifilar micro-coils, stator teeth and busses, the PSP layer is patterned separately for each metal. After plating is completed, the PSP of layer 213 is cured, that is, baked and hardened and left in place as in previous steps. The resulting subassembly, illustrated in FIG. 20, is then micro-milled to produce an ultra smooth and flat surface. A thin sacrificial layer, for example, an oxide or soluble or sublimable polymer layer, can be applied after micro-milling the upper surface of the stator layer in preparation for fabricating the rotor layer thereon. The sacrificial layer is later removed to free the rotor.

Figure 21:
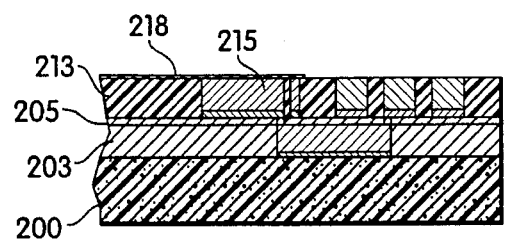
Figure 22:
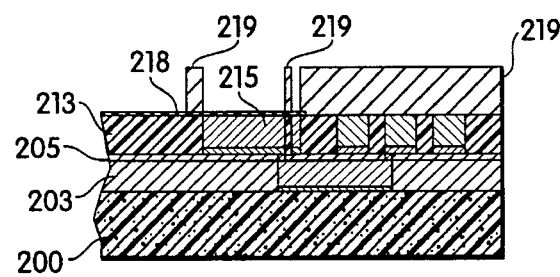
Figure 23:
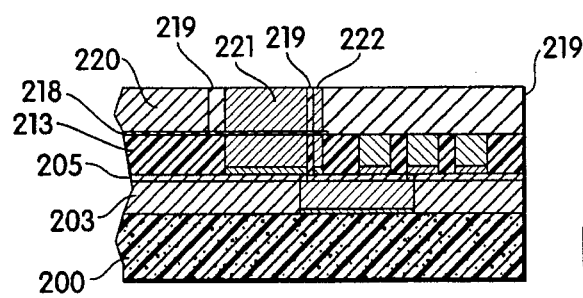

The rotor layer is next formed. A photoresist layer 218 is spun onto the upper surface of the subassembly of FIG. 20, being preferably about 2 μm thick, given a light bake, and then patterned to become a sacrificial layer for the rotor, as illustrated in FIG. 21. A thick layer 219, preferably about 20 μm thick, is then applied and patterned for the rotor shaft, rotor poles and rotor teeth, as illustrated in FIG. 22. It is a design option whether to provide one rotor pole for each bifilar coil or a different ratio. Also, the rotor teeth may be configured to match the stator teeth or may have a different number or configuration in accordance with well-know stepper motor design considerations. As indicated above, the number of busses is also an optional design feature, with each bus typically carrying a separate current phase and having a common ground. The ferromagnetic poles of the rotor may be permanently magnetized, in whole or in part, depending on whether a variable reluctance or a permanent magnet motor design is desired for the intended application of the micro-motor. FIG. 23 illustrates the micro-motor subassembly wherein the rotor shaft 220, rotor poles 221 and rotor teeth 222 are electroplated. As in the case of the stator layer, the PSP layer application and electroplating layer are reiterated as required where dissimilar metals are to be used for the aforesaid components of the rotor.

Figure 24:
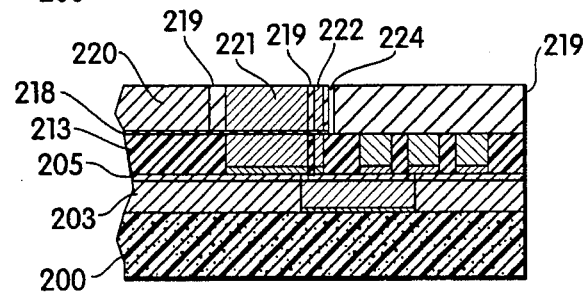

The PSP layer 219 is again patterned, as illustrated in FIG. 24, to provide a vertical sacrificial layer delineating the radially outer boundary of the rotor body. Specifically, vertical void 223 is formed approximately 2 μm wide (measured in a radial direction) and filled with photoresist material 225, as illustrated in FIG. 25.

Figure 25:
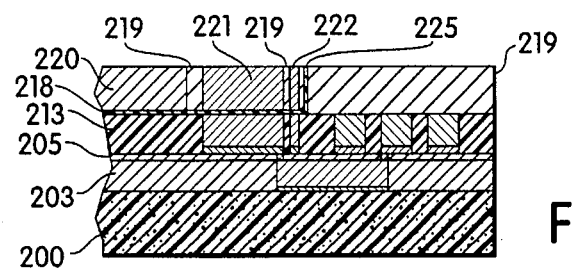
Figure 26:
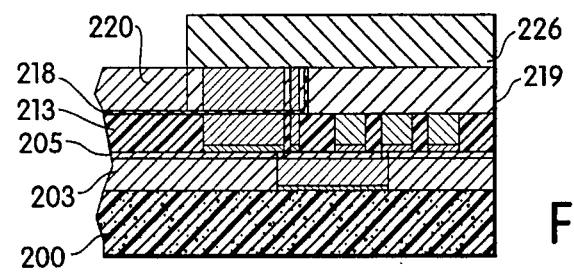
Figure 27:
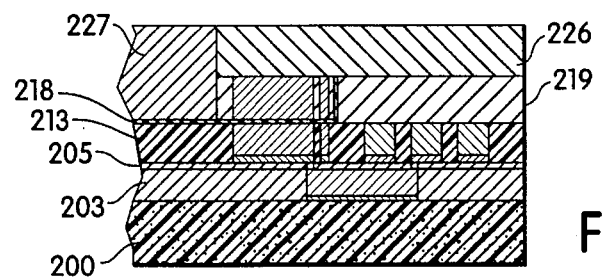
Figure 28:
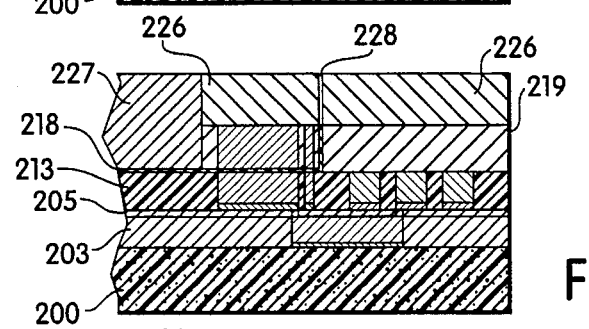
Figure 29:
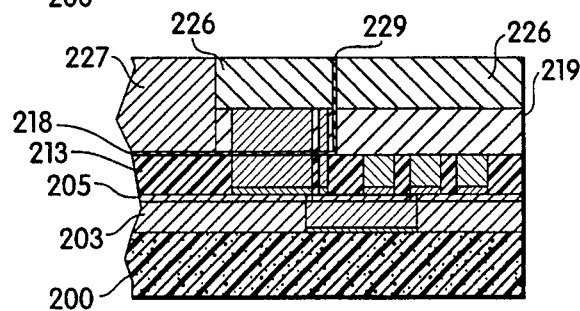

A thick layer 226, preferably about 20 μm thick, of PSP is applied onto the upper surface of the sub-assembly of FIG. 25 and patterned for increasing the vertical dimension of the rotor components. Thus, as seen in FIG. 26, PSP layer 226 is patterned for electroplating a vertical extension of the rotor shaft. Electroplated rotor shaft extension 227 is seen in FIG. 27. In the embodiment illustrated herein, the rotor poles and rotor teeth are not vertically extended, although it should be recognized that this is a design option. In FIG. 28 the PSP layer 226 is patterned again to form a void 228 for continuation of the vertical sacrificial layer defining the radial outer boundary of the rotor. In FIG. 29 the void 228 has been filled with photoresist material 229. The immediately preceding steps can be reiterated as required, for increasing the vertical dimension of the rotor components.

Figure 30:
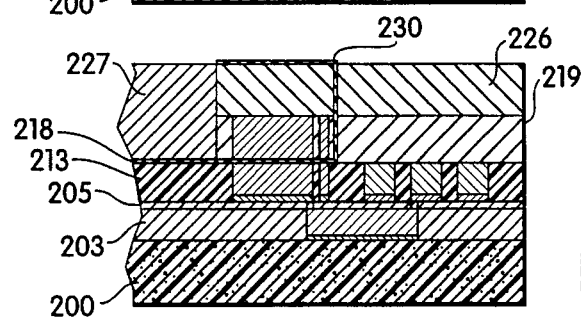
Figure 31:
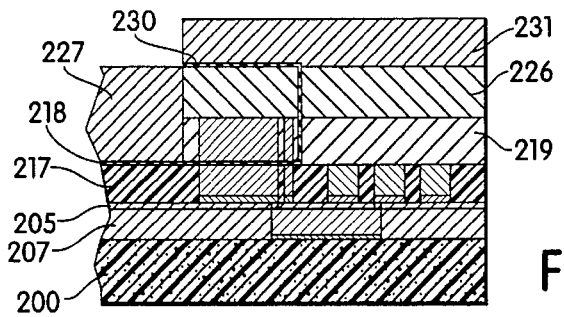
Figure 32:
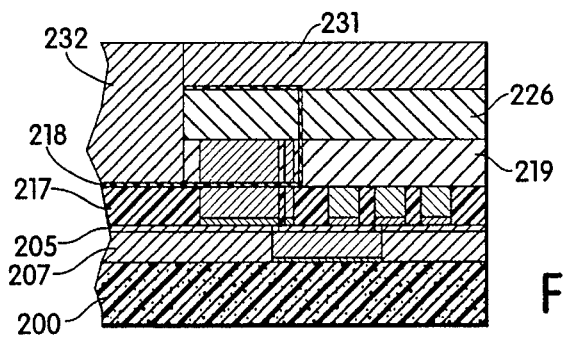
Figure 33:
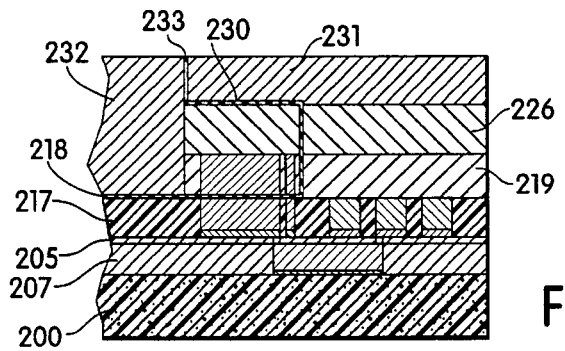
Figure 34:
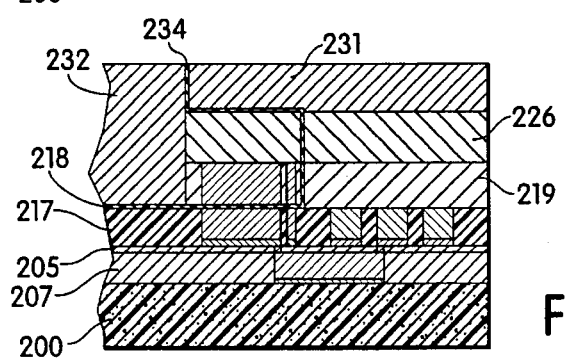
Figure 35:
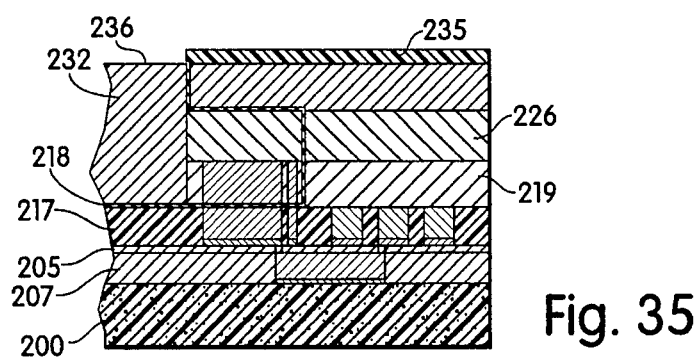
Figure 36:
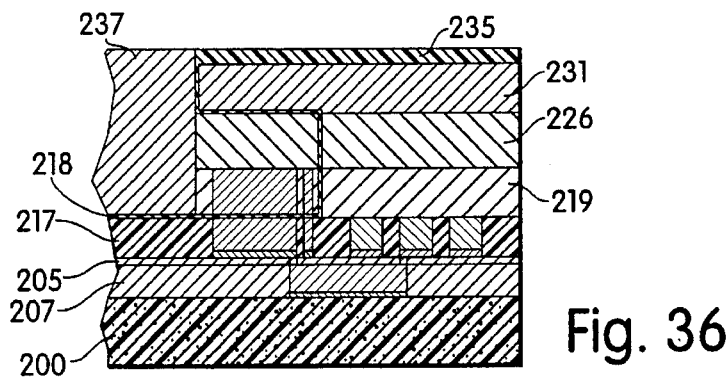
Figure 37:
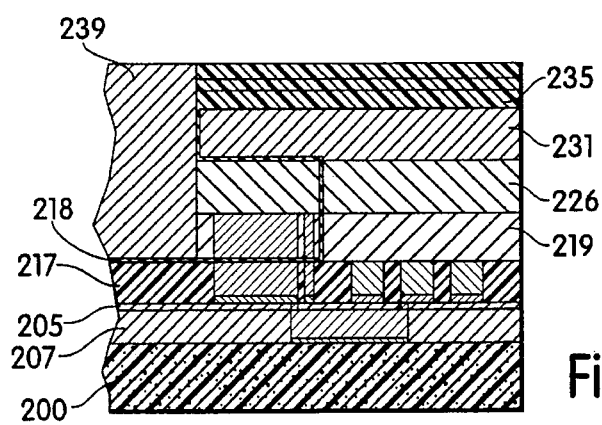

Additional photoresist material is spun on in a horizontal layer 230 and patterned, as illustrated in FIG. 30, as a sacrificial layer, preferably about 2 μm thick, defining the upper boundary of the rotor body. A thick layer 231, preferably about 20 μm thick, of PSP is then applied and patterned for further extension of the rotor shaft, as illustrated in FIG. 31. The rotor shaft is extended, as above, by electroplating through the patterned PSP. FIG. 32 illustrates extension 232 of the rotor shaft so formed. PSP layer 231 is again patterned to form a vertical void 233, preferably about 2 μm thick, (measured in the radial direction) to form a vertical sacrificial layer to release the rotor shaft. Photoresist material 234 is applied into void 233 in the patterned PSP layer 231, as illustrated in FIG. 34. FIGS. 35 through 37 illustrate iterative steps to further extend the rotor shaft. Specifically, photoresist layer 235 is spun onto the subassembly of FIG. 34 and patterned to expose the upper surface 236 of the rotor shaft. Electroplated rotor shaft extension 237 is seen in FIG. 36. Additional layers of photoresist 238 and corresponding extensions 239 are illustrated in FIG. 37.

Regarding fabrication of the rotor body, after the components intended to become permanent magnets have been formed, an entire wafer comprising multiple micro-motor subassemblies can be placed in a magnetic field, such that the magnetic poles of each of the micro-motors is given a permanent magnetization simultaneously. This is accomplished with an applied magnetic field oriented normal to the plane of the wafer. By using magnetically soft and magnetically hard materials, permanent magnets can be fabricated in situ where desired. More complex permanent magnetization patterns can also be achieved using properly shaped pole pieces ("writing heads") near to the wafer surface in registry with the ferromagnetic patterns to be magnetized. In a variable reluctance micro-motor design, the pole, rotor teeth, and stator teeth, are formed of magnetically soft material. In a permanent magnetic motor design, the rotor pole at least is made of permanent magnet material. It may be advantageous in certain application to make the bifilar micro-coils also of magnetic material. The magnetic path begins in a bifilar coil. When current passes through the coil, a magnetic field is generated in the surrounding region and in any nearby rotor pole. By making the rotor poles, rotor teeth and stator teeth of ferromagnetic material, a magnetic circuit is formed. The magnetic circuit passes through the rotor pole to the rotor teeth, from the rotor teeth to the stator teeth, and from the stator teeth back to the bifilar coil.

Figure 38:
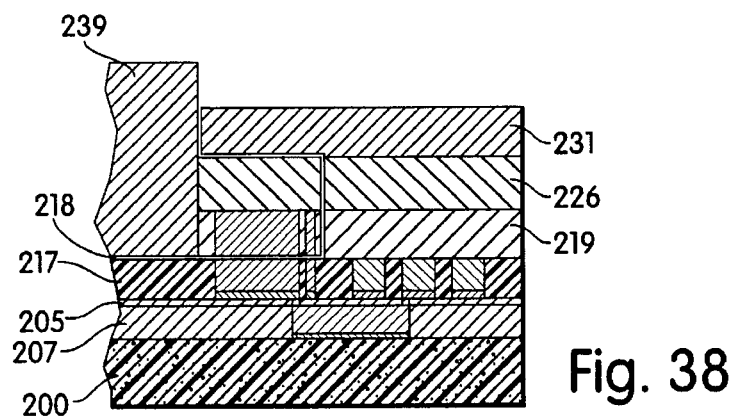
Figure 39:
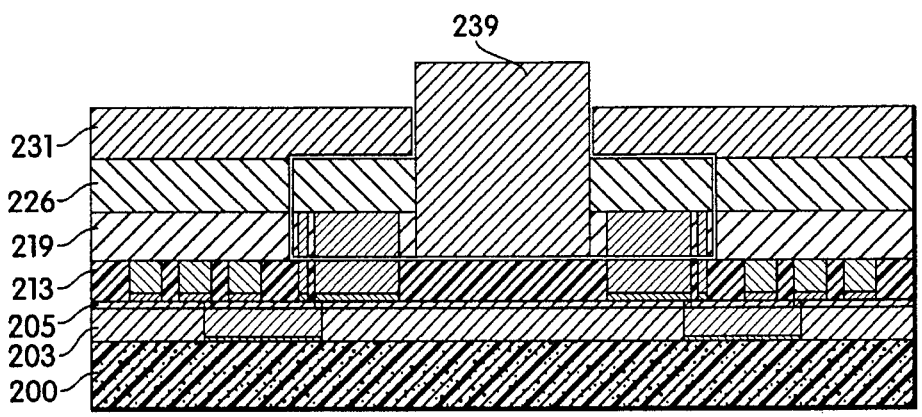

In the final fabrication steps illustrated in FIGS. 38 and 39, the PSP material is cured and remains permanently as part of the micro-motor. The photoresist of layers 235 and 238 is removed along with the photoresist material sacrificial layers 218, 225, 229, 230 and 234 to free the rotor shaft and rotor body for rotation within the micro-motor. Suitable materials for the sacrificial release material are known to those skilled in the art, including poly-α-methylstyrene, as disclosed in S. Miyoshi, et al, *A New Fabrication Process For Capacitive Compressor Sensor,* Transducers 1987, Proceedings of Fourth International Conference on Solid State Sensors and Actuators. The completed micro-motor is illustrated in full width cross section in FIG. 39.

Those skilled in the art will recognize various modifications which can be made to the preferred embodiments of the product and method described above. All such modifications within the true scope and spirit of the invention are intended to be included within the scope of the claims recited below.

I claim:

1. An analog-display device comprising, in combination, indicator means for visibly displaying a position, comprising a moveable display member, and a planar micro-motor for driving the display member, the micro-motor comprising:

a substrate;

stator means for receiving electrical current to generate an electromagnetic field, comprising a plurality of electrically conductive bifilar micro-coils supported by the substrate and arrayed radially in a first plane; and rotor means having a rotor body for rotation in response to electromagnetic fields generated by the micro-coils of the stator means, comprising a plurality of magnetic members arrayed in a second plane substantially parallel to the first plane;

wherein the display member of the indicator means is mounted for movement by rotation of the rotor body.

2. The analog-display device of claim 1 wherein the moveable display member has a free end and a mounted end, the mounted end being mounted to the rotor means for rotational movement of the display member in direct, one-to-one correspondence with rotation of the rotor body.

3. The analog-display device of claim 2 wherein the moveable display member is moveable back and forth within an arc of a circle.

4. The analog-display device of claim 1 wherein the rotor means comprises a rotor shaft having an axis of rotation substantially normal to the first plane, the rotor body being integral with the rotor shaft, and wherein the magnetic members are radially extending elongate pole members circumferentially spaced about the rotor shaft.

5. The analog-display device of claim 4 further comprising energizing means for selectively passing electrical current to the micro-coils to generate electromagnetic fields.

6. The analog-display device of claim 5 wherein the energizing means comprises at least three concentric power busses supported by the substrate, each corresponding to one of at least three current phases and each extending circumferentially from electrical connection with a terminal of a bifilar micro-coil to electrical connection with a terminal of another bifilar micro-coil of the same current phase.

7. The analog-display device of claim 6 wherein the energizing means further comprises integrated circuitry on the substrate adapted to receive an externally generated signal and, in response thereto, to control electrical current passed by the power busses to the bifilar micro-coils to drive the display member to a position corresponding to a value of the signal.

8. An analog-display device comprising, in combination, indicator means comprising a moveable display member for visibly displaying a position within a range of positions, and a planar micro-motor for driving the display member in response to an externally generated electrical signal, the micro-motor being a stepper motor comprising:

a substrate;

stator means for receiving three-phase electrical power to selectively generate electromagnetic fields, comprising (a) circumferentially spaced bifilar micro-coils supported by the substrate and arrayed radially in a first plane about a center point and (b) stator teeth arrayed in a circle in said first plane radially outward of the bifilar micro-coils;

rotor means for rotation in a second plane parallel to the first plane in response to said electromagnetic fields, comprising circumferentially spaced, elongate ferromagnetic pole members arrayed radially in a planar rotor body about a rotor shaft having an axis of rotation substantially normal to the rotor body and passing through said center point in the first plane, and rotor teeth arrayed in the rotor body in a circle in said second plane radially outward of the pole members in registry with the stator teeth; and energizing means for selectively passing electrical power to the bifilar micro-coils to generate said electromagnetic fields, comprising concentric power busses supported by the substrate, at least one of the busses corresponding to each of the three current phases, and each of the power busses comprising arcuate segments extending from one bifilar micro-coil to the next bifilar micro-coil of the same current phase;

wherein the display member of the indicator means is mounted for movement by rotation of the rotor shaft.

9. An analog gauge in a motor vehicle instrument panel comprising, in combination:

a mounting base having a display surface, at least a portion of which display surface is visible to an occupant of the vehicle, showing a range of positions corresponding to a range of values;

an elongate display member having a free end moveable within the range of positions shown on the display surface and a mounted end; and a planar micro-motor mounted to the display surface for driving the display member in response to an electrical signal, the micro-motor being a stepper motor comprising:

a substrate;

stator means for receiving three-phase electrical power to selectively generate electromagnetic fields, comprising (a) circumferentially spaced bifilar micro-coils supported by the substrate and arrayed radially in a first plane about a center point and (b) stator teeth arrayed in a circle in said first plane radially outward of the bifilar micro-coils; rotor means for rotation in a second plane parallel to the first plane in response to said electromagnetic fields, comprising circumferentially spaced, elongate ferromagnetic pole members arrayed radially in a planar rotor body about a rotor shaft having an axis of rotation substantially normal to the rotor body and passing through said center point in the first plane, and rotor teeth arrayed in the rotor body in a circle in said second plane radially outward of the pole members in registry with the stator teeth; and energizing means for selectively passing electrical power to the bifilar micro-coils to generate said electromagnetic fields, comprising concentric power busses supported by the substrate, at least one of the busses corresponding to each of the three current phases, and each of the power busses comprising arcuate segments extending from one bifilar micro-coil to the next bifilar micro-coil of the same current phase;

wherein the display member is mounted for rotational movement in response to rotational movement in the rotor shaft.

* * * * *